J. H. Nichols,
Making Knives and Forks.
N° 70,352.  Patented Oct. 29, 1867.

Witnesses,
Henry Nash
George A. Hubbard

Inventor:
Josiah H. Nichols

United States Patent Office.

JOSIAH H. NICHOLS, OF NEW BRITAIN, CONNECTICUT, ASSIGNOR TO HIMSELF, A. H. NORTH, AND G. W. LUNT.

Letters Patent No. 70,352, dated October 29, 1867.

---

IMPROVEMENT IN MANUFACTURING KNIVES AND FORKS.

---

The Schedule referred to in these Letters Patent and making part of the same.

---

TO ALL WHOM IT MAY CONCERN:

Be it known that I, JOSIAH H. NICHOLS, of New Britain, county of Hartford, and State of Connecticut, have invented certain new and useful Improvements in the Mode or Process of Manufacturing Knives and Forks; and to enable others skilled in the art to make and use the same, I will proceed to describe it by referring to the drawings, in which the same letters indicate like parts in each of the figures.

The nature of this invention consists in forming the blade and one part of a concavo-convex handle of one piece of metal by the process of swaging, and of completing the handle by soldering or brazing the other (corresponding) part thereto.

The object of this invention is to cheapen the manufacture, and produce a strong, durable, and more perfect article of table cutlery. In the accompanying drawings—

Figure 1:
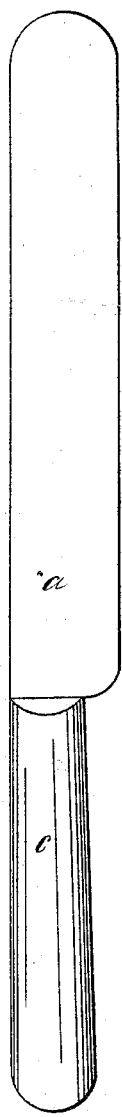
Figure 1 is a side view of a knife-blade, and a part of a concavo-convex handle, as formed in one piece of metal.
Figure 2:
Figure 2 is a view of the other (corresponding) part of a handle.
Figure 3:
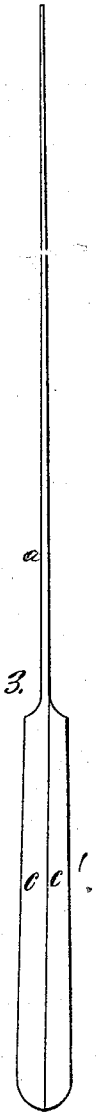
Figure 3 is an edge view, showing the knife as in a finished state.

$a$ is the blade of a knife; $c$ is the handle; $c'$ is one part of a concavo-convex handle, formed in the common way, and secured to the part $c$ by the process of brazing or soldering.

The process of manufacturing these knives or forks is substantially as follows:

A depressed or concave die is first made, of the desired size, shape, and pattern, plain or figured, as desirable, to form the handle $c$ upon the same piece of metal as that which composes the blade. This die is secured in a drop or press in the common way.

The blanks from which the blade $a$ and handle $c$ are formed are cut or formed into the proper shape or size, then they are introduced or subjected (one at a time) to the action of these dies, whereby a concavo-convex handle is produced upon the same piece of metal of the blade. In other words, the process of forming one portion of the handle on the blade is the same as now practised in forming concavo-convex handles separate from the blade, except that the metal of the die is cut away to receive the blade at its end, (end of the die.) In this way the knife is stronger and less liable to get loose in the handle, and I am enabled to produce a cheap, strong, and useful article of manufacture.

I believe I have thus shown the nature, construction, and advantage of this improvement so as to enable others skilled to make and use the same therefrom.

What I claim, therefore, and desire to secure by Letters Patent, is—

The blade $a$, and one part of a handle, $c$, when formed of one piece of metal, substantially as described.

I claim uniting one part of a handle, $c'$, formed in the common way, to said blade and handle $a$ $c$, substantially as described.

JOSIAH H. NICHOLS. [L. S.]

Witnesses:
 HENRY NASH,
 GEORG A. HUBBARD.